Figure 1:
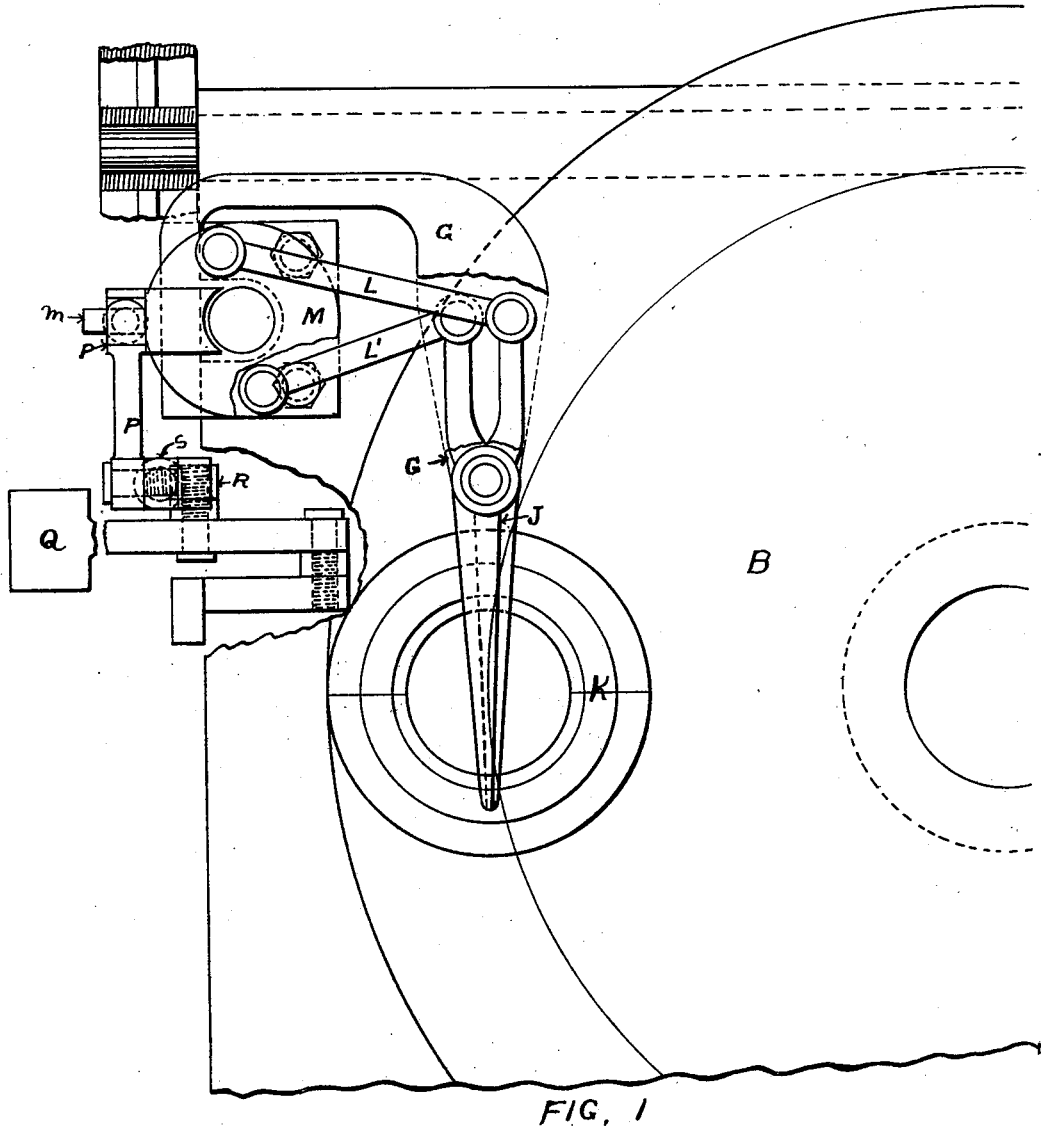

(No Model.)  
2 Sheets—Sheet 1.

B. B. HOUGH.
APPARATUS FOR MANUFACTURING GLASS OBJECTS.

No. 592,784.  
Patented Nov. 2, 1897.

WITNESSES

INVENTOR  
Benjamin B. Hough

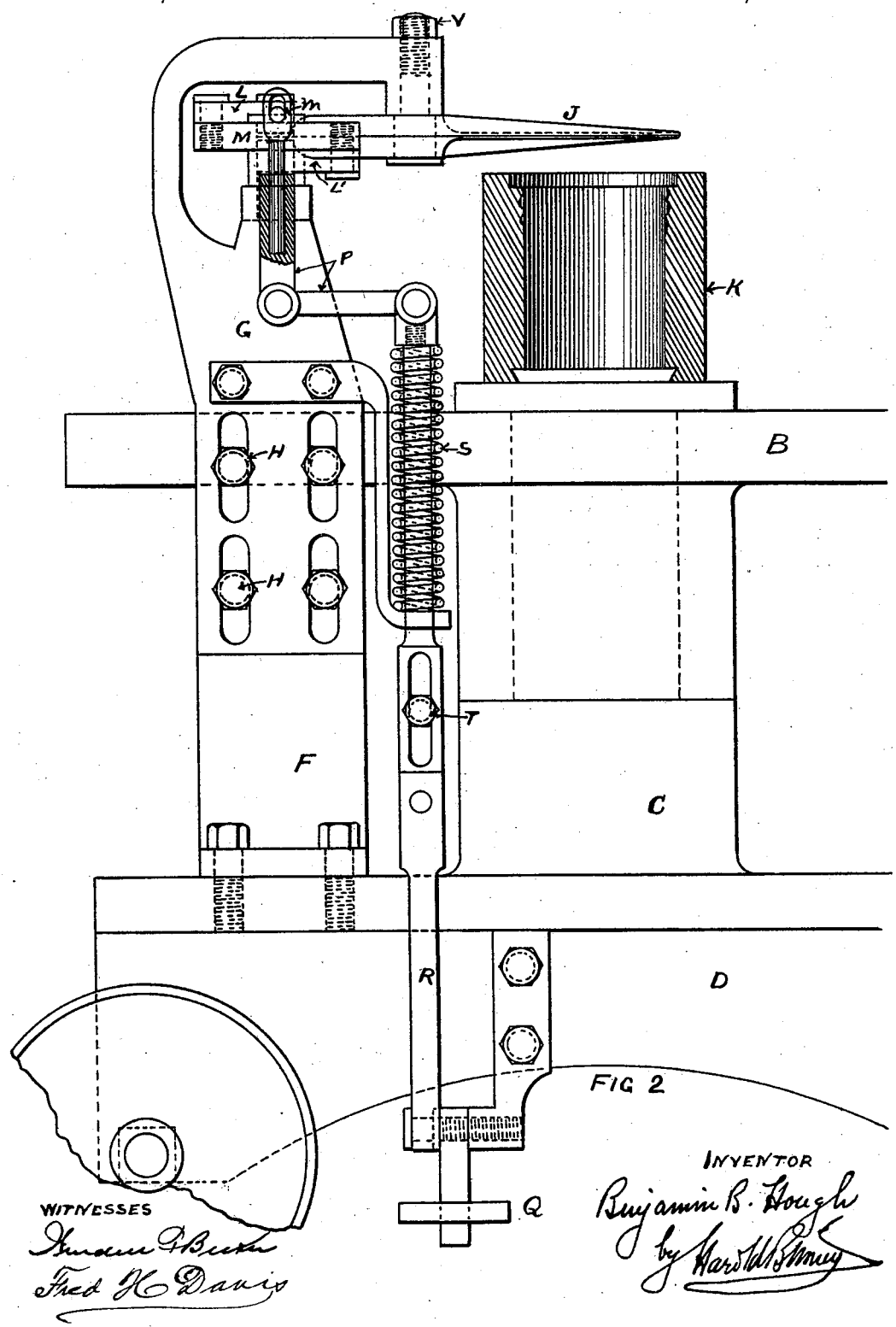

United States Patent Office.

BENJAMIN B. HOUGH, OF MILLVILLE, NEW JERSEY, ASSIGNOR OF ONE-HALF TO BOND VALENTINE THOMAS, OF SAME PLACE.

APPARATUS FOR MANUFACTURING GLASS OBJECTS.

SPECIFICATION forming part of Letters Patent No. 592,784, dated November 2, 1897.

Application filed June 4, 1897. Serial No. 639,440. (No model.)

*To all whom it may concern:*

Be it known that I, BENJAMIN B. HOUGH, a citizen of the United States, residing at Millville, in the county of Cumberland and State of New Jersey, have invented certain new and useful Improvements in and Relating to Apparatus for Manufacturing Glass Objects, of which the following is a description, referring to the accompanying drawings, which form a part of this specification.

Pressed-glass objects are usually made in some such method as the following: A gatherer-boy gathers the hot glass "metal" to the requisite amount upon the end of the gathering-iron and then brings the metal over the mold, which has previously been placed in the proper position. The presser then estimating the amount of glass needed for the object to be made cuts it off, allowing it to fall directly into the mold. The plunger then acts upon the metal in the mold, causing it to fill all parts of the mold and so form the bottle or other object.

The object of the present invention is to improve this process by making it simpler and more certain and at the same time making it unnecessary to employ a skilled presser. By my invention the gatherer is enabled to cut off the amount of metal required, drop it in the mold, and operate the plunger. These objects are accomplished by arranging mechanical shears operated by the gatherer and so coöperating with the molds that the glass will pass directly from the shears into the mold. Preferably the shears are mounted so as to just clear the top of the mold and are held open by a spring or other mechanical means, so that the gatherer-boy can bring the metal to the right position and raise it or lower it, so as to estimate the proper amount to be cut by the shears and so that when he operates the shears the glass as it is cut off lies directly in the mold ready for the operation of the plunger.

The details of the mechanism and also certain incidental objects to be accomplished will be clearly apparent from the description of the accompanying drawings, which illustrate one preferred embodiment of the invention.

Figure 1 is a plan view showing the mold, mechanically-operated shears, and the table which supports the mold. Parts of the table and framing are broken away. Fig. 2 is a front elevation showing the mold and certain other parts in section. This figure corresponds to Fig. 1 as seen from the left side of Fig. 1.

Throughout the figures like letters of reference indicate like parts.

In the embodiment of the invention shown in the drawings, B indicates a table, which is preferably rotary, upon the base C. The base C may be mounted on a wheeled truck D, so as to be readily moved from place to place. An upright standard or bracket F carries an adjustable bracket G, which may be adjusted in a vertical plane by means of the bolts and slots H. This vertical adjustment determines the height of the mechanical shears J above the mold K. The shears J are supported and pivoted upon the bracket G, as clearly shown in the figures, in such position that when closed the shears extend laterally above the center of the mold K, so that the vertical axis of the mold if projected upward intersects the shears. This requirement is not absolute, as a slight variation from it may take place without causing trouble.

The two blades of the shears are provided with the connecting-links L L', which extend to two wrist-pins in the rotary body of disk M. The partial rotation of this disk M opens or closes the shears. Movement is given to the disk M by means of a bell-crank lever P and a pedal Q. The pedal is mounted upon the base or upon the truck and the vertical connecting-rod R extends between the bell-crank and the pedal connecting the two. When the pedal is depressed, the shears J are closed. When the foot is taken off the pedal, a spring or weight acts to raise the pedal and open the shears. In the drawings this spring is shown at S acting directly upon the connecting-rod R. The length of this connecting-rod R is adjustable by means of the bolt and slot T. By this means when the shears J are raised and lowered by adjusting the bracket G the length of the connecting-rod R may be adjusted to correspond. The adjustment of the rod R also enables the operator to adjust the working position of the pedal Q at his pleasure.

The mold K is brought under the shears J and removed therefrom by turning the table B, and it will be understood that this is also the means I prefer for carrying the mold from the shears to the press, though other means may be employed for this purpose.

The wear upon the blades of the shears may be taken up by means of a jam-nut V. Special provisions (not shown) may of course be taken to compensate for wear in other parts of the apparatus; but I have not found these precautions necessary in practice. So, also, the form of the several parts of my apparatus may be modified without departing from their purpose in relation to the operation of the shears and the mold.

The operation of the apparatus is as follows: The height of the shears is adjusted so that they will be just over the open top of the mold which is to be used. The mold is then put upon the table and the table moved to bring the mold exactly beneath the open shears. The gatherer gathers the hot glass upon the end of his iron and brings it into position between the shears directly over the mold. By raising or lowering his iron he determines the amount of hot glass which the shears will cut and he then operates the pedal Q, thereby cutting off the glass so that it falls directly into the mold K. The mold is then removed from beneath the shears and the next mold brought into place. The release of the pedal Q opens the shears J, and the process is ready to be repeated.

What I claim, and desire to secure by these Letters Patent, is the following:

1. In combination with a mold and its support, mechanically-operated shears supported directly above the said mold, a pedal and mechanical connections for closing the said shears, a spring or weight for opening the said shears, means for adjusting the height of the said shears and securing them when adjusted and means for adjusting the mechanical connections between the said pedal and the said shears to correspond to the adjustment of the shears, substantially as set forth.

2. In combination with a mold and its support, mechanically-operated shears in fixed relation to the said mold and its support when the said mold is in position, means for adjusting and fixing the height of the said shears, and a pedal and mechanical connections for operating said shears, substantially as set forth.

3. In combination with a mold, a horizontally or laterally adjustable support upon which the said mold is mounted, mechanically-operated shears supported in fixed relation to the path of motion of the said mold, so that by the adjustment or movement of the said support the mold may be brought directly beneath the said shears, and means for operating the said shears, substantially as set forth.

In testimony whereof I have hereunto set my hand this 24th day of May, 1897.

BENJAMIN B. HOUGH.

Witnesses:
S. W. FOX,
HARRY C. WOODRUFF.